US008467412B2

(12) United States Patent
Alexander

(10) Patent No.: US 8,467,412 B2
(45) Date of Patent: Jun. 18, 2013

(54) ADAPTIVE RATE SHIFTING FOR DELIVERY OF VIDEO SERVICES TO SERVICE GROUPS

(75) Inventor: James Alexander, Highlands Ranch, CO (US)

(73) Assignee: Ericsson Television Inc., Duluth, GA (US)

( * ) Notice: Subject to any disclaimer, the term of this patent is extended or adjusted under 35 U.S.C. 154(b) by 389 days.

(21) Appl. No.: 12/760,499

(22) Filed: Apr. 14, 2010

(65) Prior Publication Data

US 2011/0255555 A1    Oct. 20, 2011

(51) Int. Cl.
*H04J 3/22* (2006.01)

(52) U.S. Cl.
USPC .......................................................... 370/468

(58) Field of Classification Search
USPC . 370/229, 230, 230.1, 464, 465, 468; 725/86, 725/87, 91, 93, 95
See application file for complete search history.

(56) References Cited

U.S. PATENT DOCUMENTS

| | | | | |
|---|---|---|---|---|
| 6,014,694 A * | 1/2000 | Aharoni et al. | ............... | 709/219 |
| 6,269,078 B1 * | 7/2001 | Lakshman et al. | ............ | 370/230 |
| 6,986,156 B1 * | 1/2006 | Rodriguez et al. | ............... | 725/95 |
| 7,843,824 B2 * | 11/2010 | Wu | ............... | 370/230.1 |
| 7,962,637 B2 * | 6/2011 | Su et al. | ........................ | 709/231 |
| 2003/0084461 A1 * | 5/2003 | Hoang | ......................... | 725/145 |
| 2005/0289618 A1 | 12/2005 | Hardin | | |
| 2006/0095942 A1 * | 5/2006 | van Beek | ........................ | 725/81 |
| 2006/0222110 A1 * | 10/2006 | Kuhtz | ........................... | 375/334 |
| 2008/0101405 A1 * | 5/2008 | Wirick et al. | ................... | 370/468 |
| 2008/0101410 A1 * | 5/2008 | Barkley et al. | ................. | 370/473 |
| 2008/0310446 A1 | 12/2008 | Bellwood et al. | | |
| 2009/0031384 A1 | 1/2009 | Brooks et al. | | |
| 2011/0197239 A1 * | 8/2011 | Schlack | ............................. | 725/95 |

* cited by examiner

*Primary Examiner* — Chi Pham
*Assistant Examiner* — Robert Lopata

(57) ABSTRACT

A video stream is provided to a set top box of a viewer to fulfill the viewer's request for a video on-demand service. The video stream is encoded at one of a plurality of encoding rates selected by a Service Quality Manager based on parameters defined for a service group, which in various embodiments may comprise the viewer, or the viewer along with other customers serviced by a single QAM. The parameters used for determining the encoding rate may involve currently allocated bandwidth, the viewer's service parameters, other customer's service parameters, and historical data regarding encoding rate selection data. The encoding rate used to encode a stream may be modified during streaming in response to other service requests. The encoding rate may be shifted based on anticipated service requests from other members in the service group.

16 Claims, 11 Drawing Sheets

ADAPTIVE RATE SHIFTING FOR DELIVERY OF VIDEO SERVICES TO SERVICE GROUPS

FIELD OF INVENTION

The disclosed invention generally pertains to adapting the video encoding rate for video on-demand services to subscribers in a service group in a cable system, where the rate adaption is based on current or projected bandwidth usage conditions.

BACKGROUND OF THE INVENTION

Many video service providers transmit video information to viewers in response to an explicit request from the viewer. The provision of video on-demand ("VOD") service is well known in the art, and is in distinction from broadcast transmission of video information, which occurs according to a schedule. With VOD, the actual video programs transmitted are determined by the viewer and often cannot be individually predicted. However, on an aggregate basis, many video services providers can predict viewer demands for VOD programming.

Video service providers store the VOD programs as digital video files. These are frequently called "video assets" and are structured as "packages", which refers to well known industry standards where data is formatted and content is defined in a certain manner. This allows the digital video file of the content to be distinguished from meta-data, which is data that pertains to the video information. The use of "packages" facilitates processing of the files in various ways. The video information is often encoded using a standardized format, such as MPEG, which is well known in the art. Within a given encoding standard, there may be various encoding formats supported.

The video service provider may store a video program using one encoding format, but may convert it ("transcode") it to another format for distribution. This may be necessary because the target encoding format may be compatible with other equipment and may be able to only display a lower resolution. Typically, using a lower resolution format requires less data to convey the video information, and hence less bandwidth is required for transmission of the file. Thus, there is typically a direct relationship between the encoding scheme for encoding video information, the associated quality of resolution of the video images displayed, and the associated bandwidth required to transmit the video data.

Video service providers are usually concerned about the bandwidth involved in distributing the video, because it is a finite resource. Regardless of the distribution technology used, managing bandwidth allocation for different users is challenging. In many cases, service providers will charge different rates based on the amount of bandwidth used. Consequently, service providers are concerned how much bandwidth is used by a viewer because it can impact the quality of service (i.e., the video quality) that other viewers receive.

Because video service providers can transcode a video program in different ways, and the use of a particular encoding scheme impacts the bandwidth associated with transmitting that program, it would be desirable for a video service provider to be able to effectively manage how bandwidth is allocated based on which encoding scheme is used.

BRIEF SUMMARY OF THE INVENTION

Various embodiments of the invention are possible, including embodiments that define a system or method for streaming on-demand programming for a viewer at a given encoding level from a plurality of encoding levels, where the encoding level is selected based on various information, which can include available resources for a service group, service parameters for the viewer, and historical information regarding encoding levels. In another embodiment, the system can adjust encoding level of a given stream in response to other requests from other viewers in the service group.

BRIEF DESCRIPTION OF THE SEVERAL VIEWS OF THE DRAWING(S)

Having thus described the invention in general terms, reference will now be made to the accompanying drawings, which are not necessarily drawn to scale.

DETAILED DESCRIPTION OF THE INVENTION

Figure 1:
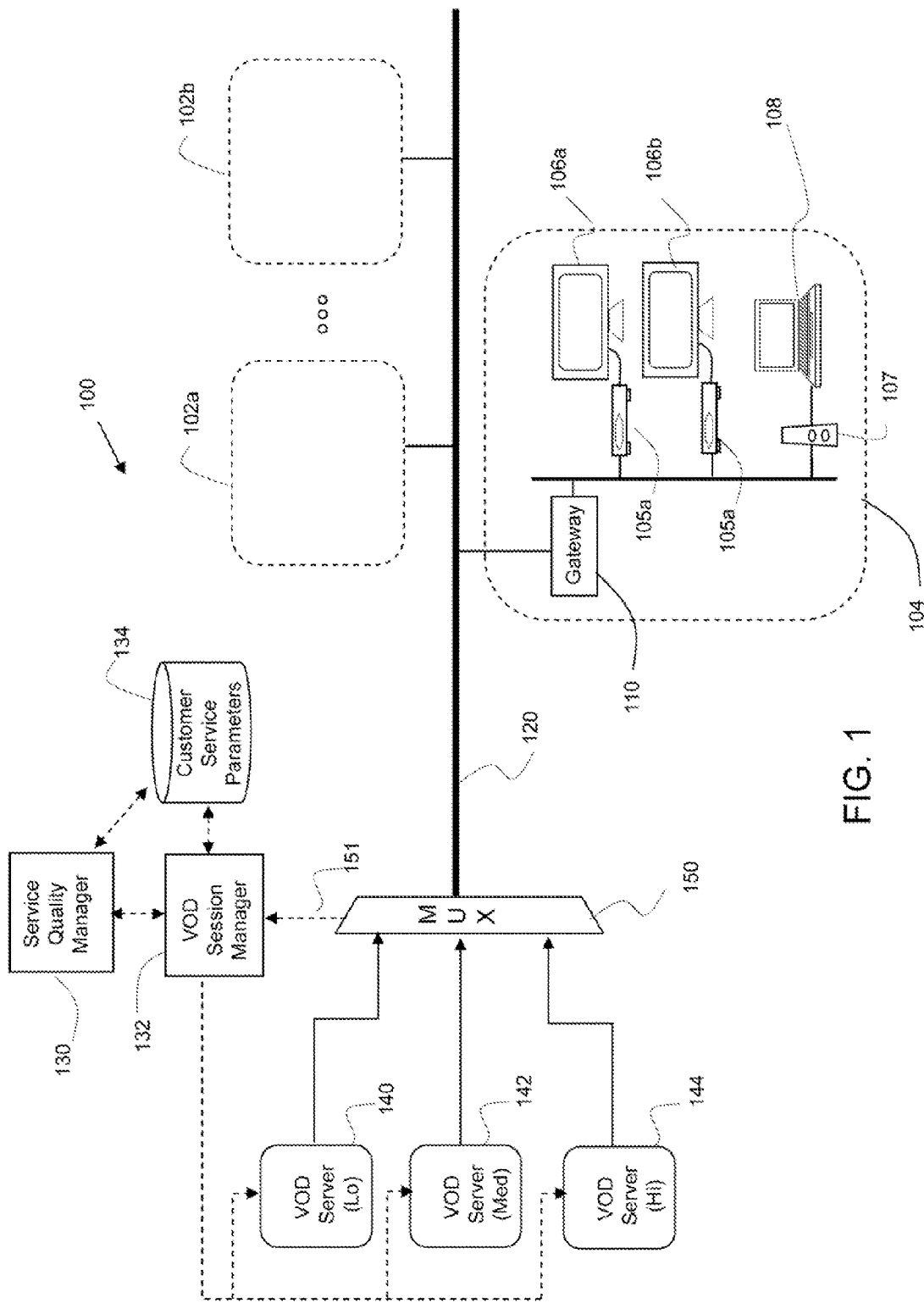
FIG. 1 illustrates one embodiment of the environment for adapting the video encoding rate of video services to a service group.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although some specific terms are employed herein, they are used in a generic and descriptive sense only and not for purposes of limitation.

Although certain methods, apparatus, systems, and articles of manufacture have been described herein, the scope of coverage of this patent is not limited thereto. To the contrary, various embodiments encompass various apparatus, systems, and articles of manufacture fairly falling within the scope of the appended claims either literally or under the doctrine of equivalents.

As should be appreciated, the embodiments may be implemented in various ways, including as methods, apparatus, systems, or computer program products. Accordingly, the embodiments may take the form of an entirely hardware embodiment or an embodiment in which computing hardware, such as a processor or other special purpose devices, is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods performed using computer hardware, apparatus, systems, and computer-readable program products. It should be understood that the block diagrams and flowchart illustrations, respectively, may be implemented in part by processor executing computer-readable program instructions, e.g., as logical steps or operations executing on a processor in a computing system or other computing hardware components. These computer-readable program instructions are loaded onto a computer, such as a special purpose computer or other programmable data processing apparatus, to produce a specifically-configured machine, such that the instructions which execute on the computer or other programmable data processing apparatus implement the functions specified in the flowchart block or blocks.

Process Definition

The process involves adapting the encoding rate for a video stream provided to a viewer. The video service involves a video on-demand service ("VOD"), which streams digitally encoded video to a viewer by a video service provider ("VSP") over a distribution network. Typically, the video is encoded using an MPEG based encoding standard, which is a well known industry standard for digitizing video, but other encoding process can be used. Further, although the principles of the invention are illustrated using a video services provider in the form of a cable services provider ("CSP") and using a wireline distribution network (e.g., hybrid fiber coax or other shared transmission medium), the principles of the present invention apply to other distribution mediums or technologies sharing common transmission resources, including wireless forms of communication. This specifically includes satellite or cellular (3G, 4G, WCDMA, etc.) based delivery of video services.

MPEG-2 provides for different encoding levels, which support different frame rates and resolutions. These, in turn, are associated with different bite rate profiles. For example, the MPEG Levels referred to as "LL", "ML", "H-14" and "HL" correspond to 4, 15, 60, and 80 mega-bits/second bandwidth requirements. Other encoding processes may provide for further levels or format resolutions. It is not necessary to limit the present invention to MPEG based encoding levels, but MPEG illustrates a common application of the invention.

Adapting the encoding rate by the service provider is partially transparent to the user in that the viewer does not explicitly request adapting the encoding rate. Rather, the service provider may adjust the encoding rate based on conditions that the viewer is unaware of, such as the volume of other viewers' requests for VOD services. Typically, the viewer is associated with various quality-of-service ("QOS") parameters that limit or define the quality of streamed video, and those parameters may be consulted by the service provider to confirm that the network may adapt or modify the bandwidth ("BW") allocated for a stream being transmitted (or about to be transmitted) to the viewer.

The process of adapting the encoding rate represents one approach for adjusting limited resources (i.e., the BW available on a shared medium) involving a viewer in light of other viewers' request for VOD programs. Typically, the viewers' collective requests typically occur with some predictability, and hence a service provider will likely observe predictable traffic patterns. For example, Saturday evening may be a popular time for families to watch movies between 7:00 p.m.-11:00 p.m., whereas other time periods (e.g., 2:00 a.m.-9:00 a.m. Tuesday morning) may not be a popular time for viewers to request VOD programs.

The allocation of BW described herein typically does not apply to broadcast video programs. In the case of broadcast video programs, the bandwidth allocation is usually predictable. Broadcast programming may be provided continuously (24 hours/day), or may be provided for most of the day (e.g., 20 hours/day). However, the certainty of providing the programming means that appropriate resources can be allocated on a predictable basis. Because this type of distribution is accessible to all viewers, the fact that more viewers may tune to a broadcast channel does not consume any additional bandwidth. Rather, additional bandwidth on the distribution medium is consumed when additional users request video on demand services (in their various forms, including VOD Movies, Pay-Per-View Events, etc.). When this occurs, the request for additional streaming means additional BW is being consumed, and there is only a fixed amount of BW that can be allocated.

However, in other broadcast video environments, the number of programs provided may vary based on time of day, and it is possible to allocate different BW for different level of quality for different programming. For example, during late night, fewer channels may be broadcast, and this may allow certain programming to adjust the quality level of the encoding. In such instances, the broadcast video programming can be considered as having varying traffic levels and quality encoding levels, and thus application of the principles of the present invention can be applied. However, for ease of illustration purposes, the principles of the present invention are explained using on-demand programming.

The amount of BW allocated for a VOD stream can be impacted by the particular encoding rate used for that video stream. The allocation of an encoding rate impacts the quality of the image viewed on the user's television set. While CSPs would like viewers to always have the highest quality viewing experience possible, this is not always practical. Some CSPs may provide an additional charge to receive higher quality programming because it consumes more bandwidth. Not all viewers may find the additional quality provides a significant benefit to justify the cost involved. If the viewer does not have an appropriate high resolution television, then the higher encoding may not result in a higher quality image, and hence the viewer may not be willing to pay a premium for high encoding quality. Alternatively, if the viewer has a television capable of displaying high resolution, but the programming was not originally filmed in a high resolution format, then again, a lower resolution encoding scheme may be acceptable to the viewer. The viewer may thus select through subscription parameters, the various QOS parameters to be applied to their viewing of programs. Further, the network may opt to alter the encoding rate based on these parameters. The parameters can be defined in different ways by different service providers without departing from the scope of the invention. Further, in some embodiments, the parameters can be set by the service provider without explicit indication from the viewer.

The QOS parameters are accessed by the service provider can be used to: 1) determine whether a current video stream should be modified from its current encoding rate to accommodate other VOD requests on the shared medium, or 2) whether a future (e.g., requested) VOD video stream should use a particular encoding rate. In one embodiment, the QOS parameters can be used to define a default or preferred encoding rate for a VOD stream. The QOS parameters impact the encoding scheme selected, and hence impact the BW allocated or encoding rate used for a video stream. Thus, the various levels of QOS, the various encoding rates, and various BW used by a video stream are directly related. Thus, while these concepts are inter-related, they are distinguishable. Determining the encoding rate determines the amount of BW consumed.

In one embodiment, the QOS parameter indicates a minimum threshold of quality of the video stream to be provided to a user. However, this level may be exceeded by the network so as provide a higher default level of encoding, if that higher level of encoding can be provided by the service provider. For example, the viewer may be associated with a QOS parameter indicating "medium" quality video is to be provided, but the service provider may provide "high" quality video if there is available BW. However, in other instances, the service provider may expect that during certain times, other viewers' video requests are likely to be received and because they may request "high" quality video, there would be insufficient BW to fulfill these subsequent requests. To avoid this possibility, the service provider may modify encoding rate used for the first request. Specifically, if adding a high-quality rate encoded VOD stream exceeds a threshold of available BW on a distribution facility, the network may readjust or lower the encoding rate of other VOD sessions in order to accommodate the present request. This is particularly the case if the other VOD sessions include viewers having QOS parameters allowing a lower QOS standard, but are presently receiving a high quality session because at the time they requested the session, additional BW was available to allocate.

The definition of the threshold level of the QOS and the resulting encoding rate used requires defining a universe based on which the threshold applies to. Typically, these are users of a group (i.e., the group of potential or actual video streams associated with the users) such that the collective bandwidth defines the maximum bandwidth that can be allocated. This universe of users (called a service group) can be defined in different ways that have different sizes. In the present invention, two types of service groups are defined. First, the service group can be defined as a "household," which comprises the set of various potential video streaming receiving devices that a customer may operate at a common service location. This can referred to as a Customer, since the Service Group is a group of one customer (although there may be multiple individuals in the household). Second, the service group can be defined as a set of households, which in one embodiment are approximately 12-20 households. In this case, the set of households is typically the number of channels that a single QAM can accommodate. Hence, this is referred to as a QAM Service Group.

In the case of the service group defined as a household, the embodiment reflects the practicality of defining QOS parameters by a customer subscription parameter. Namely, the customer, which typically is associated with a service location, agrees to a service level for receiving services at that location. Typically, the location is a household, and the customer may have a number of devices located therein, which may be used at various times and in different ways. The customer associated with the household may limit the aggregate number of streams, or number of high quality video streams.

In the case of the group defined as a service group ("Service Group"), the size is based on the maximum number of households that typically can be serviced by a single QAM multiplexor. The bandwidth of a QAM is limited, and that provides an inherent basis for limiting aggregate bandwidth for VOD sessions to users. However, the bandwidth of a single QAM may change with technology improvements, and the number of users depends on various factors. Hence, a flexible mechanism needs to be defined. However, this group is larger than a single household or customer, so that threshold values associated with the aggregate number of households must be taken into account.

With this understanding, the context of FIG. 1 can be better appreciated. FIG. 1 illustrates a system 100 reflective of one embodiment of the invention comprising a number of households 102a, 102b, 104. Together, this set of households could be considered a Service Group in one embodiment, where they all connect to the same cable distribution network 120. Each household may have different equipment and configurations, and one typical configuration 104 is illustrated. In this configuration, the household utilizes a gateway device 110, which serves various functions, including acting as a local routing hub. The gateway may also have functionality for communicating information with various cable headend components. The household 104 further comprises two set top boxes ("STB") 105a, 105b connected respectively to two televisions 106a, 106b. In this embodiment, both televisions are capable of displaying a high quality (resolution) video. Also included is a PC 108 connected to a DOCSIS compliant cable modem 107, which is connected to the inside cable wiring. The PC may receive video via an Internet connection, and a distinction is drawn between a video provided by the cable service provider as opposed to a third party. If the video is provided by the cable service provider, then it is possible that the CSP can alter the quality of the video as disclosed herein.

The cable headend includes a multiplexor 150 that receives various inputs and provides corresponding streams on the cable distribution network 120. The multiplexor also receives from the STB, and provides to other equipment, the "upstream" signaling as shown as a dotted line 151. While the streams may include various broadcast programs (not shown), the more pertinent video streams are associated with various on-demand servers 140, 142, 144. As will be discussed shortly, there are various embodiments that are possible, and this embodiment depicts three different servers. The first server 140 is a low quality (or lower resolution) encoded video file that is stored in the VOD Server. The same program may also be stored in a medium resolution or medium quality image encoding in VOD Server 142. Finally, a third server 144 is shown that stores a high quality or high resolution image. Not all embodiments will have physically separate server, but logically these can be viewed as distinct entities, which aids in illustrating the principles of the present invention.

The depiction of three levels of encoding quality or resolution is for illustrative purposes only. There may be additional levels, and the selection of three encoding levels is sufficient to illustrate the principles of the invention in a convenient manner. Further, there are various embodiments as to how the files are stored, and how the streams are provided to the multiplexor 150. In the embodiment in FIG. 1, the solid lines indicate facilities capable of conveying signals and video streams, whereas the dotted lines typically only convey signaling information. Although arrows are indicated, these illustrate the main direction of information, and the facilities are in practice often actually capable of bidirectional communication.

The three VOD servers 140, 142, 144 are controlled by a VOD Session Manager 132, which also receives the viewer's VOD related signaling requests via line 151. The VOD Session Manager can be viewed as the control application in a VOD Server, which comprises a data store for storing the VOD video assets. Typically, the user requests a VOD program using a menu structure. This occurs by the user interacting with the set top box using a remote controller, resulting in a VOD request sent upstream to the VOD Session Manager. The VOD Session Manager ensures the appropriate VOD server streams the requested program to the multiplexor and is streamed by the multiplexor on a defined channel to the viewer's STB. The VOD Session Manager then informs the STB which channel to tune in order to view the requested movie.

In this embodiment, the VOD Session Manager 132 interacts with two other elements: a Customer Service Parameter database 134 and a Service Quality Manager 130. The Customer Service Parameters comprise various subscription related data values that are used in determining what level of quality should be provided to the viewer. Thus, these parameters are typically defined on the basis of a customer (e.g., typically, a household). Thus, each household 104, 102a, and 102b would have a distinct set of Customer Service Parameters. These could include how many simultaneous VOD streams are allowed, the total on-demand bandwidth that can be allocated to the customer, and what quality the streams should be. For purposes of illustration, the parameters for household 104 could indicate that three simultaneous high quality streams are allowed, comprising two high quality streams and one medium quality definition stream. This would allow, for example, the household to view a high quality program on each television set simultaneously, while recording a third, medium quality encoded program using a STB with digital video recording capability.

The VOD Session Manager 132 also interacts with the Service Quality Manager 130. The Service Quality Manager ("SQM") is able to also interact with the Customer Service Parameters (either directly, or via the VOD Session Manager) to ascertain how many, and of what type, existing VOD sessions the customer presently has underway. The SQM knows via the VOD Session Manager what other sessions are established with that customer, what service levels are assigned to the customer, and the available bandwidth of the network resources allowed. In other embodiments, the SQM can query the STB of the viewer to obtain the current usage information. However, in many cases, the cable service provider will maintain this information. Thus, the SQM can then inform the VOD Session Manager which VOD Server providing the appropriate encoding level should be used (e.g., low, medium, or high quality or encoding resolution level). Thus, while a VOD Session Manager is focused on how a particular individual customer is to be handled, the Service Quality Manager may also have input on this, and the SQM has knowledge of the resources and demands of which the requesting viewer is but one customer.

Thus, FIG. 1 shows a basic environment 100 of the cable headend where different encoding quality levels are stored in different VOD servers, and the appropriate quality level of encoding is selected based on customer associated service parameters.

Figure 2:
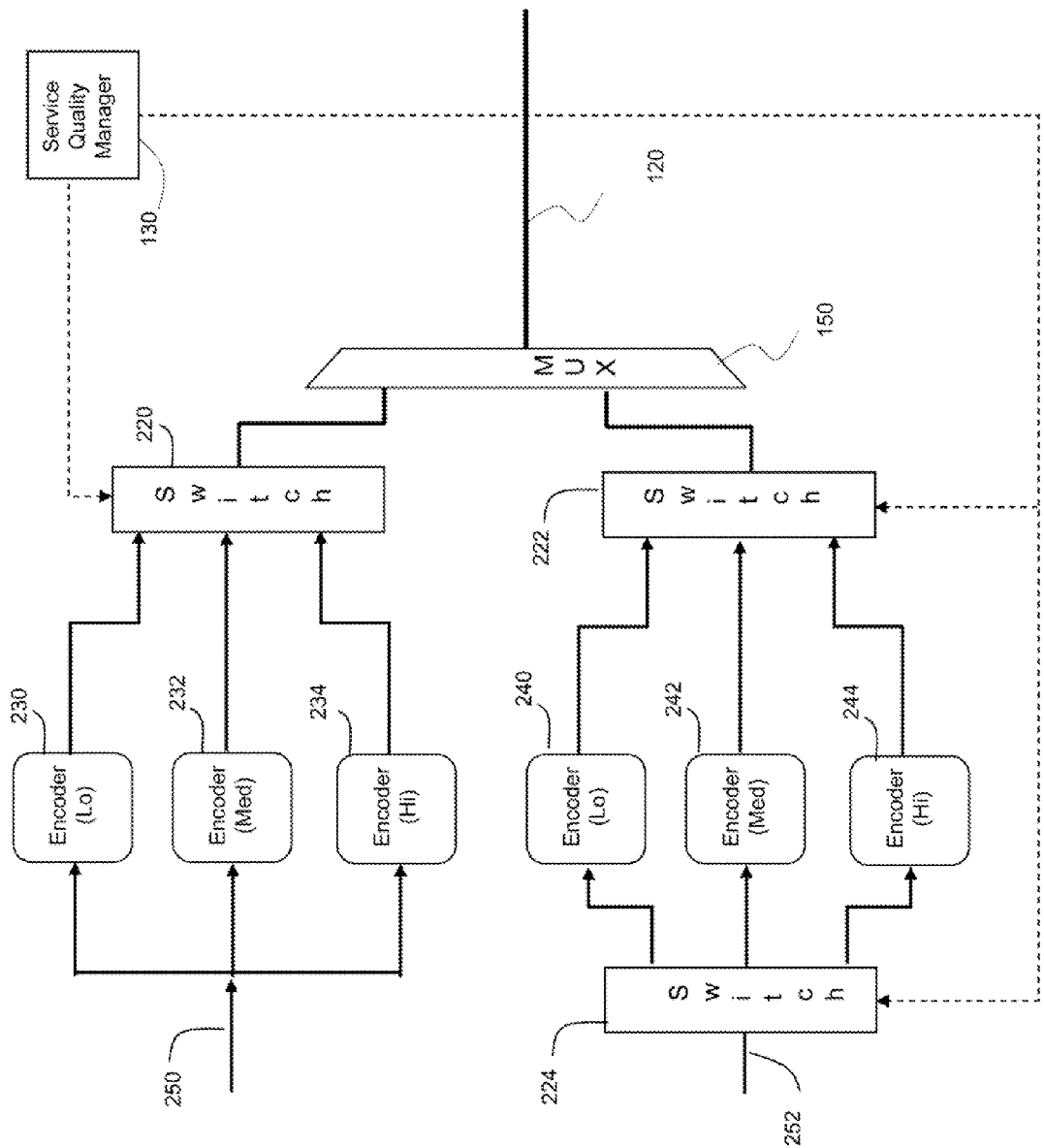
FIG. 2 illustrates embodiments of how different encoded video streams can be created.

FIG. 2 illustrates alternative embodiments for generating and controlling the various encoded video streams. The adaptation of which stream to provide is shown in FIG. 2 with two embodiments, including encoders 230, 232, and 234 and encoders 240, 242, and 244. In one embodiment, a video stream 250 is provided to three encoders 230, 232, 234 simultaneously. The video may be provided from a VOD server or other source. Each encoder represents the necessary hardware/software for transcoding the video input to the desired encoding quality and output format. Of course, as noted before, the bandwidth required is commensurate with the encoding level. In some embodiments, the video source providing the input stream 250 may already be encoded at the highest quality level, and transcoding the video stream at encoder 234 into the "high" quality level may in effect, require no transcoding. Thus, in certain embodiments, a direct line could be drawn through the high level encoder 234. However, for purposes of illustration, it is assumed that some transcoding will be required, and hence encoder 234 is present. Typically, transcoding the video signal is usually done by receiving as input a higher quality signal and encoding it at a lower quality level. Each of the encoder's output is received at the switch 220. The switch 220 selects one of the inputs and transfers the signals to the output, which is turn is provided to the multiplexor. The selection of which input the switch is to provide to the multiplexor is control by the SQM 130. Consequently, the SQM controls the encoding rate for the input video 250 (which is presumed to have been previously selected by the viewer). Although not shown, the SQM may interact with the VOD Server and the Customer Service Parameters.

FIG. 2 also illustrates another embodiment for selecting which encoding rate to provide the viewer, which involves switch 223, encoders 240, 242, and 244, and switch 222. In this embodiment, the VOD input stream is provided to switch 224, which directs the video to a particular output port, which corresponds to one of the encoders. The video is received by the encoder, transcoded and provided to switch 222. Again the SQM configures the switches 224 and 222 in unison, so that when a video signal is provided to an encoder, the corresponding output of that encoder is switched through switch 222 to the multiplexor. In this manner, the viewer can control the encoding rate for the video provided to the viewer. Although this embodiment requires an additional "front end" switch 224 relative to the previous embodiment, this approach potentially allows another video input to be switched through switch 224 to one of the unused other two encoders, and then switched back through switch 222 to the multiplexor. In this manner, the unused video resources could potentially be used for another viewer requesting a VOD movie. Although each of the encoders is shown as encoding a single stream, other embodiments may encode multiple streams simultaneously.

Figure 3:
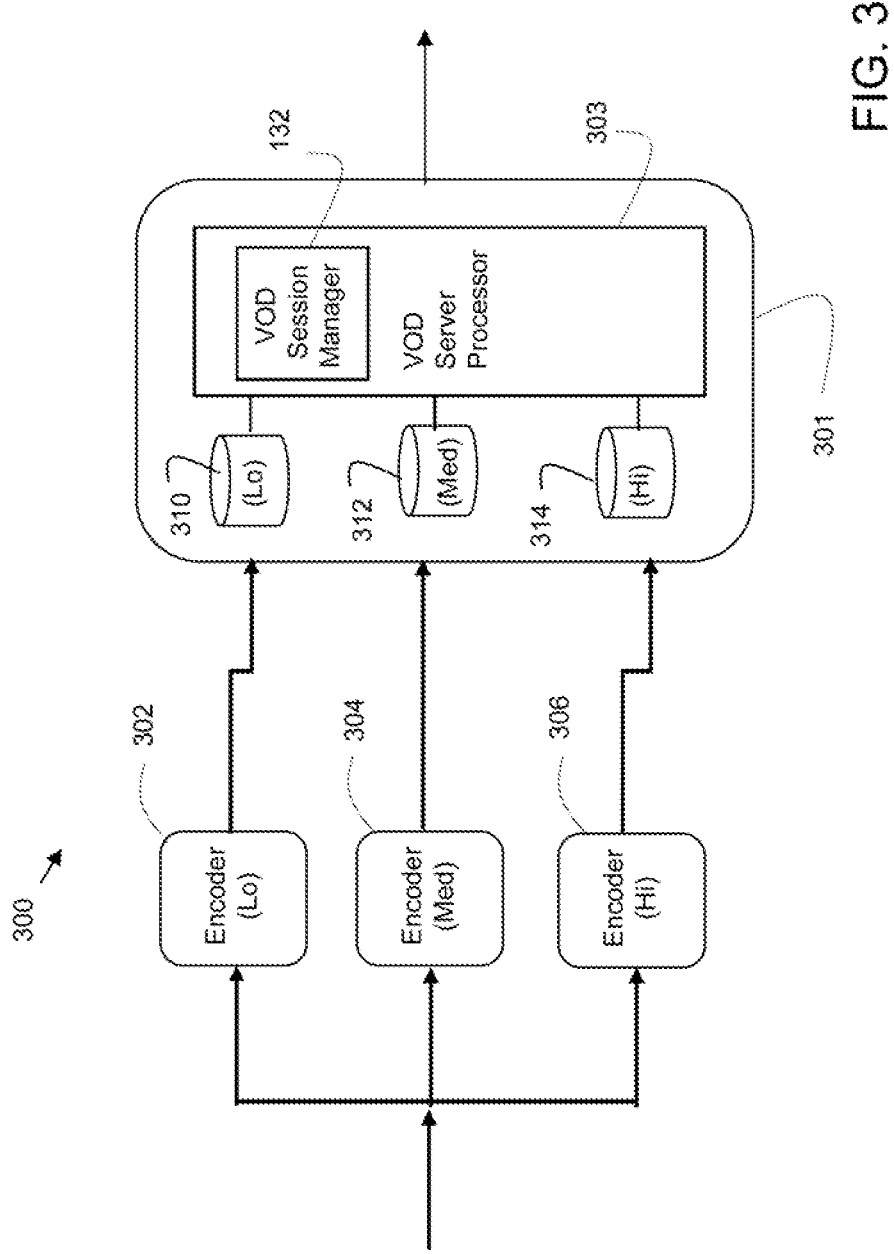
FIG. 3 illustrates another embodiment of how different encoded video streams can be created.

Another embodiment is shown in FIG. 3, wherein one of several encoding streams can be stored for future streaming to the viewer. In FIG. 3, the multiplexor and other equipment is not shown, as it is evident that in one embodiment, the output of VOD Server 301 is provided to the multiplexor.

In FIG. 3, the video stream is provided to three encoders—a low resolution encoder 302, a medium resolution level encoder 304, and a high resolution level encoder 306. Each encoder transcodes the video stream simultaneously, and the resulting stream is sent to a VOD Server 301, that comprises three logical data stores 310, 312, and 314. These data stores maintain a low resolution encoded copy of the video stream, as well as a medium and high resolution encoded copy. In this manner, the VOD server stores all three encoded versions, and the VOD Session Manager 132, which is the control application executed by the VOD Server Processor 303 selects which of the several versions to stream out. Thus, the VOD Session Manager selects which version to stream, and in effect controls the rate of the stream. This embodiment has the advantage that newly added movies can be streamed to the VOD server during off hours, and that the various encoding levels of the same program can be stored on the VOD server, thus, avoiding resource contention issues involving the encoders.

Each of the embodiments for providing different encoding streams can be altered and modified. Thus, those skilled in art can develop additional architectures or variations for streaming and/or storing different encoded VOD based video streams.

Adapting the Encoding Rate

Figure 4:
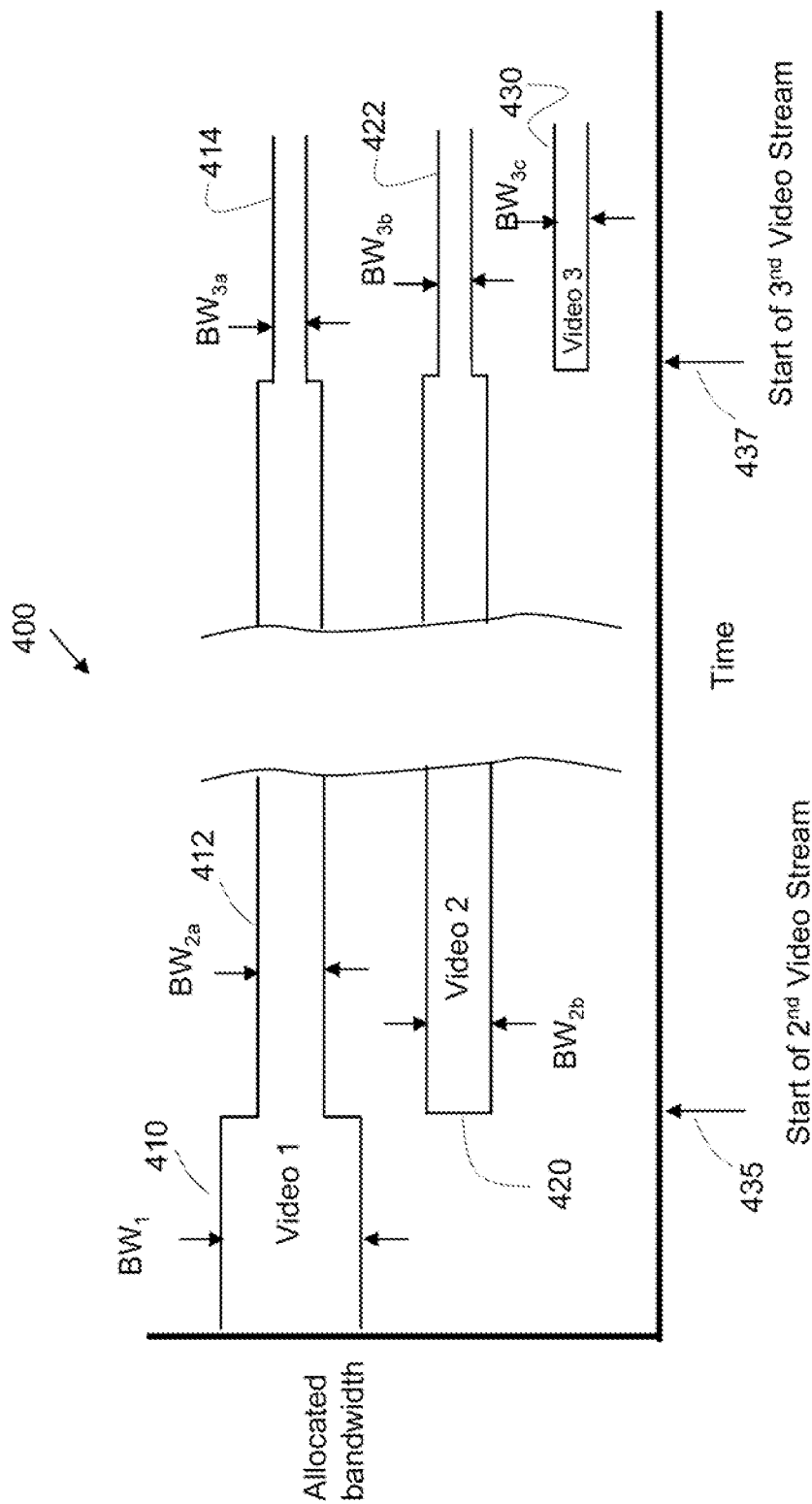
FIG. 4 illustrates one embodiment of how bandwidth can be allocated for different video streams.

The encoding rate for on-demand video streams is adapted in real time in response to changing conditions, including additional viewers' requests for on-demand video. One embodiment is illustrated in FIG. 4. In FIG. 4, the representation 400 is of the various allocated bandwidth (which is commensurate with the encoding type) shown over time. The X axis represents time, and is linear. The Y Axis, which is the allocated bandwidth is not a linear scale but rather represents relative allocated bandwidth by the relative width. For example, at point 410, video 1 has a bandwidth of BW1, which is relatively larger (e.g., wider) than at point 412, which is BW2a. The bandwidth allocated to video 1 is reduced in light of Video 2 420 that is requested (and provided) to the viewer at time 435. The network determines that the bandwidth for Video 1 has to be reduced, in order to accommodate Video 2, and that Video 2 would be presented at a reduced bandwidth, BW2b.

Similarly, at time 437, which is the start of the third Video Stream, the respective bandwidth for Video 1 and Video 2 has to be reduced in order to accommodate Video 3 430. Thus, certain thresholds are used to determine whether a new video stream can be provided to the viewer, which depends in part on the presently provided streams to a set of viewers, their encoding levels, and each viewer's service parameters. The allocated BW is reduce by migrating the stream to a lower quality encoding rate.

Figure 5:
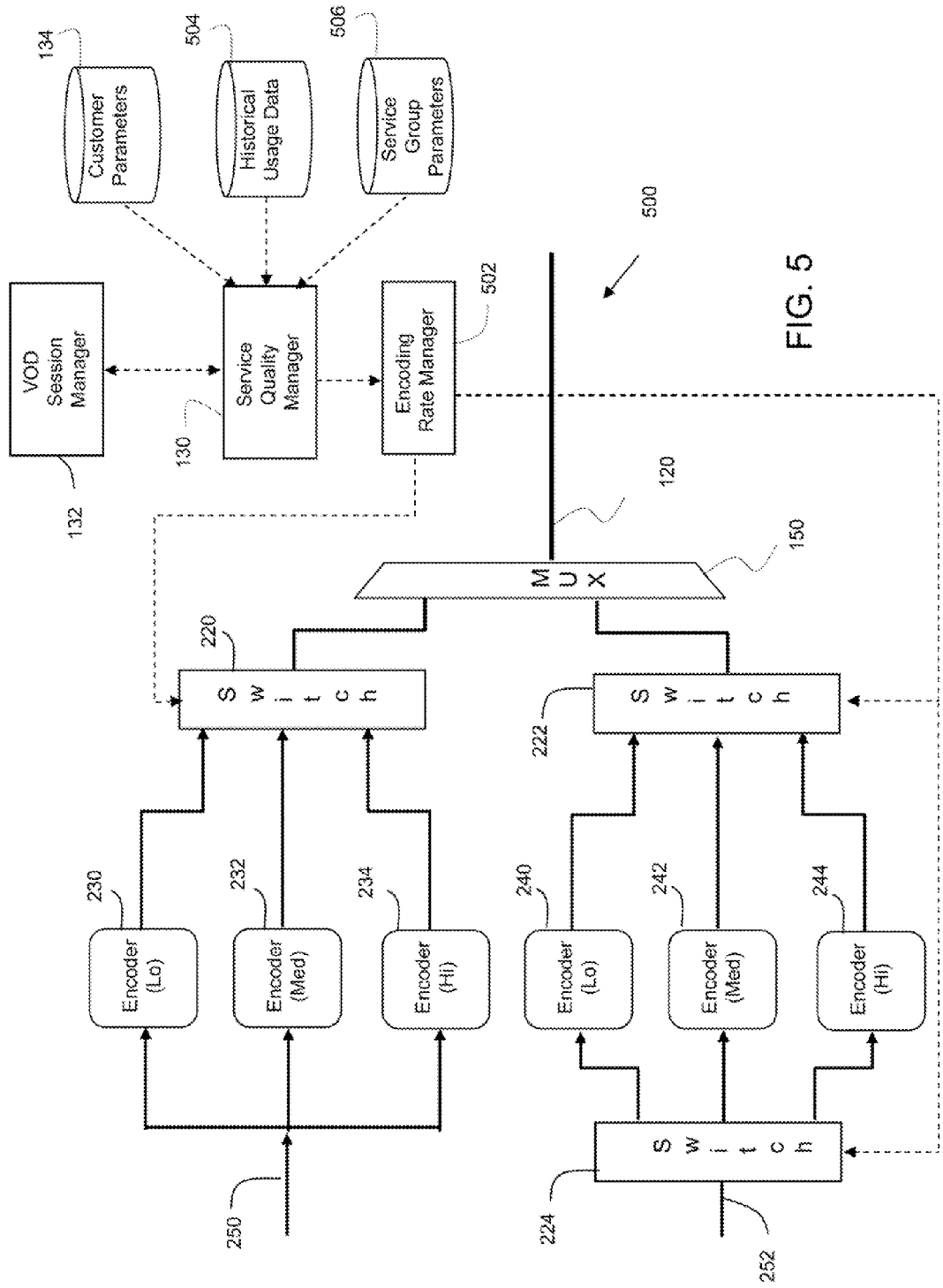
FIG. 5 illustrates another embodiment of an environment for adapting the video encoding rate of video services.

The embodiment of FIG. 5 illustrates another embodiment wherein the encoding components are controlled by other components that are aware of the various service parameters. In FIG. 5, the system comprises the various encoding structures which can provide different encoded streams of an on-demand video as previously discussed. Further, the embodiment of FIG. 3 and other variations can be incorporated as well. In FIG. 5, the encoding rate manager 502 is added which knows the various encoding architectures, and knows how to manage the various switch resources 220, 224, and 222 to affect the desired encoding rate. The encoding rate manager removes the requirement for network configuration knowledge from the SQM 130, which can now merely instruct the Encoding Rate Manager as which encoding streams to provide. This allows decoupling of the service aspects from the network architecture aspects.

The SQM receives as inputs information regarding the customer's service parameters 134, which was previously discussed. In addition, in some embodiments the SQM may also receive historical usage data, which includes information about when a viewer or set of viewers select VOD programming and the associated response by the network. This includes information regarding when the system 500 had to adjust rate encoding for viewers. Thus, all the historical usage data including what bandwidth was requested, allocated, and granted for all video requests are available as input to aid the SQM to predict how the system 500 should react to the VOD request.

For example, data may be maintained indicating that five different encoding levels are available for viewers of a Service Group. The historical data indicates that whenever the highest encoding level (assume this is "level 5") is allocated for a viewer for a request in the evening, that it usually is dropped to a level 4 because of other subsequent requests from members of the Service Group. The network may instead allocate a level 4 encoding, so as to avoid changing the encoding level.

The SQM 130 also has available data comprising Service Group Parameters 506, which defines the size and members of a Service Group for the particular QAM multiplexor involved. Typically; a QAM multiplexor has sufficient capacity to accommodate the video on-demand traffic for 12-20 households. The Service Group can also be viewed as the maximum possible bandwidth that can be allocated based on physical distribution resources.

Finally, in FIG. 5, the SQM interacts with the VOD Session Manager 132 to obtain information about how many existing VOD sessions have been established, and with which viewers and Service Group(s). In various embodiments, it is possible that different types of Service Groups may be involved. In various embodiments, the current bandwidth allocated to a VOD session may be stored in the VOD Session Manager, or may be maintained in the Historical Usage Data file 504. Thus, the SQM knows about which VOD sessions are active and what encoding scheme (and hence associated bandwidth) each session presently has.

Service Quality Management System Architecture

Figure 6:
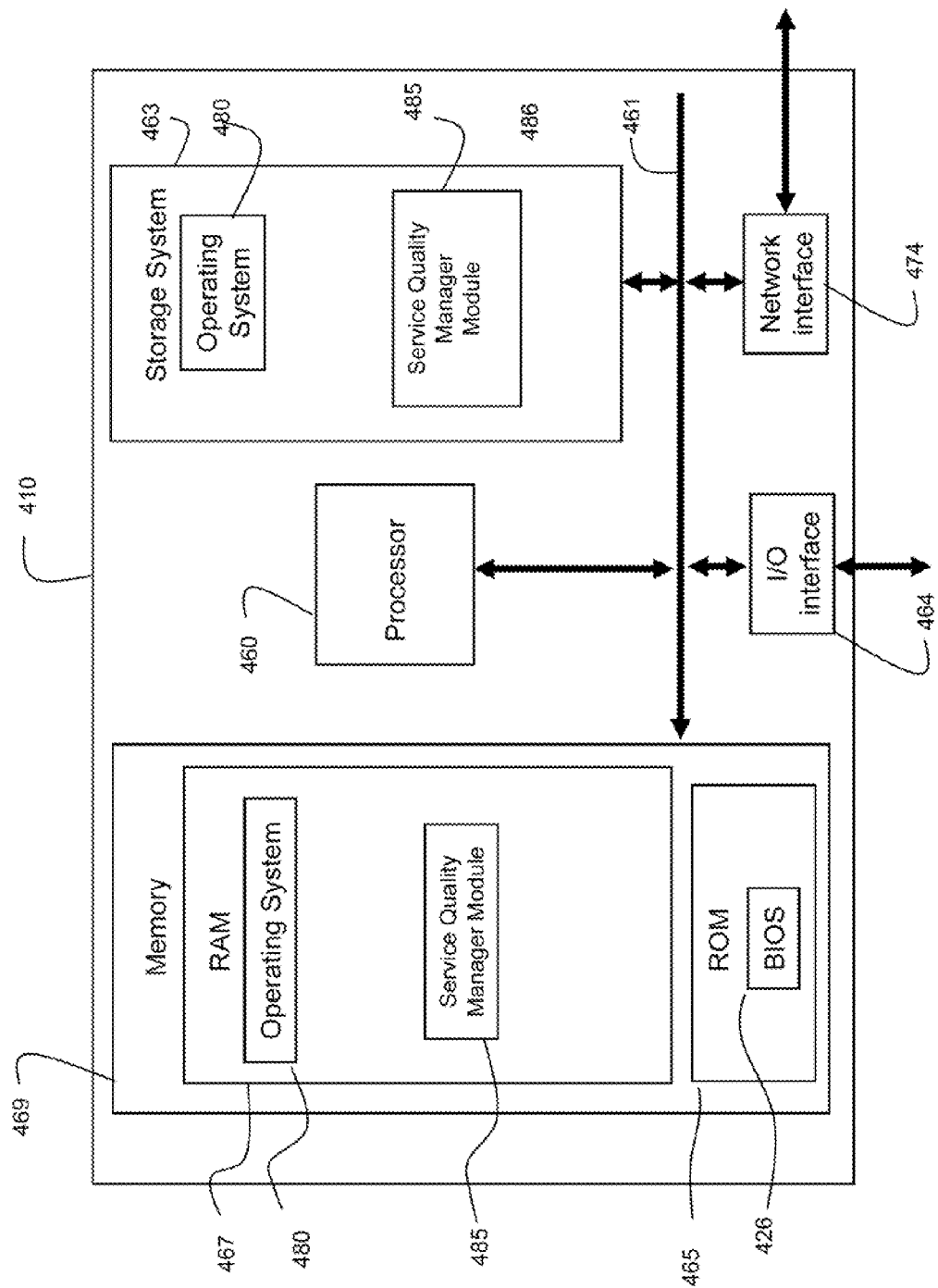
FIG. 6 illustrates one embodiment of the Service Quality Manager system.

One embodiment of the SQM system architecture is shown in FIG. 6. In FIG. 6 the system 410 comprises a memory 469, which can comprises a RAM type of memory 467 and a ROM type of memory 465. The RAM memory may store a working version of the operating systems 480 and a Service Quality Manager Module 485, which executes the process described below. The ROM may also store BIOS data 426 as is well known in the art. A processor 460 executes the instructions of the SQM module, as well as other instructions, and communicates with memory via bus 461. The processor may also interact with a second data store, a storage system 463, which can be co-located, or remote. The storage system may also store a copy of the operating system 480, and the SQM module 485, which is loaded in to RAM at bootup. The bus 461 allows data transfer to occur between the processor, and also allows input/output data to occur using I/O interface 464 and a network interface 474. Various other embodiments of the SQM system 410 are possible, including architectures using parallel or distributed processing.

Service Quality Processing Algorithm

The above SQM system of FIG. 6 executes various instructions, which are algorithms. One such algorithm is the process of the SQM allocating bandwidth can be based on various inputs, with one embodiment shown in FIG. 7. The process 700 is based on allocating BW for a "new" customer (e.g., a household) 705. The customer is "new" because no BW is allocated to them presently, or this is for an additional request. Hence, the process is initiated in conjunction with the viewer requesting a VOD stream. The VOD server first determines whether the requested program exists in the library and determines whether the viewer is authorized to request the service. In other words, in one embodiment the program request should be available before resources are allocated. In this embodiment, the VOD Server requests the SQM to determine an appropriate encoding rate for the stream and relies on the SQM to then ensure the appropriate encoders and switching resources are arranged for processing the video stream. In another embodiment, the SQM can determine the appropriate encoding rate, and inform the VOD Server of the appropriate encoding rate, and the VOD Server then invokes the Encoding Rate Manager to ensure that the proper encoding rate is provided via the encoder and switching resources. The process disclosed in FIG. 7 can be adapted and function with either arrangement.

After the request for the encoding level is received in step 710, the SQM ascertains the current usage profile for this customer. This involves determining how many VOD sessions are presently active for this customer in step 715. This may be accomplished by the SQM querying the VOD Session Manager. Next, in step 720, the SQM obtains the Customer QOS Parameters by querying the appropriate database. Thus, at this point, the SQM knows the relevant information regarding 1) what the customer is requesting regarding a VOD session, 2) how many VOD sessions are active for the customer, and 3) what quality level of encoding the customer should receive.

Typically, the Customer QOS Parameters indicate a minimum quality level that should be present for rate encoding the stream for a VOD session. For example, if the customer always receives the highest quality of encoding, then the default level will always be the highest encoding level. In some embodiments, such a QOS parameter provides no flexibility by the service provider to alter the encoding rate. On the other hand, if the customer's QOS parameter indicates a medium level of encoding, then the service provider may provide a high level encoding if allowable. If provided, the service provider may subsequently, during the streaming of the video, reduce the encoding to a medium level to accommodate another request for a second video stream from that viewer. Thus, the system can provide a high quality video for the first request, and reduce it in order to accommodate a second request.

The SQM may also track a total allowable BW value or encoding levels for a customer. In this embodiment, the SQM may allow any number of streams (or a number of streams up to a limit), such that the aggregate BW for each type of stream is not exceeded. For example, a threshold BW limit may allow a customer to have two high quality streams, or three medium quality streams. A number of variations are possible as to how BW can be allocated, and/or existing streams can be modified. The SQM can also track and allocate resources based on either BW, or encoding rate levels (because the two are correlated).

With this understanding, the logic is step 725 can be understood. The SQM determines whether allocating the default encoding rate for that requested video stream would exceed an aggregate BW allocated to that customer. If allocating the stream at the default rate level does not exceed any limits for that customer, then step 735 is occurs. In this step the SQM instructs the Encoder Manager to allocate the resources for providing the indicated encoding level. Then, in step 745, the SQM allocates the indicated BW for that customer for the additional video stream.

If, however, during step 725 allocating the default BW for the requested VOD stream would exceed a threshold limit assigned to the customer, the SQM would perform various functions to adjust or otherwise fulfill the VOD request without exceeding the BW threshold limit. Thus, in step 730, the SQM may reduce the BW consumed by changing the encoding level for a current video stream to that customer. Optionally, in step 740, the SQM may allocate a lower level of encoding for the newly requested VOD stream. The particular steps that are to be taken vary in each embodiment, and may include additional or different steps.

In step 750, the SQM then updates the VOD Session Manager regarding the type of encoding allocated. (In other embodiments, the SQM may retain this information). In step 755, the SQM authorizes the VOD Server to stream the movie. The Encoding Manager has established the necessary network configuration so that the indicated encoding level is provided. The process is then completed at step 760.

Figure 7:
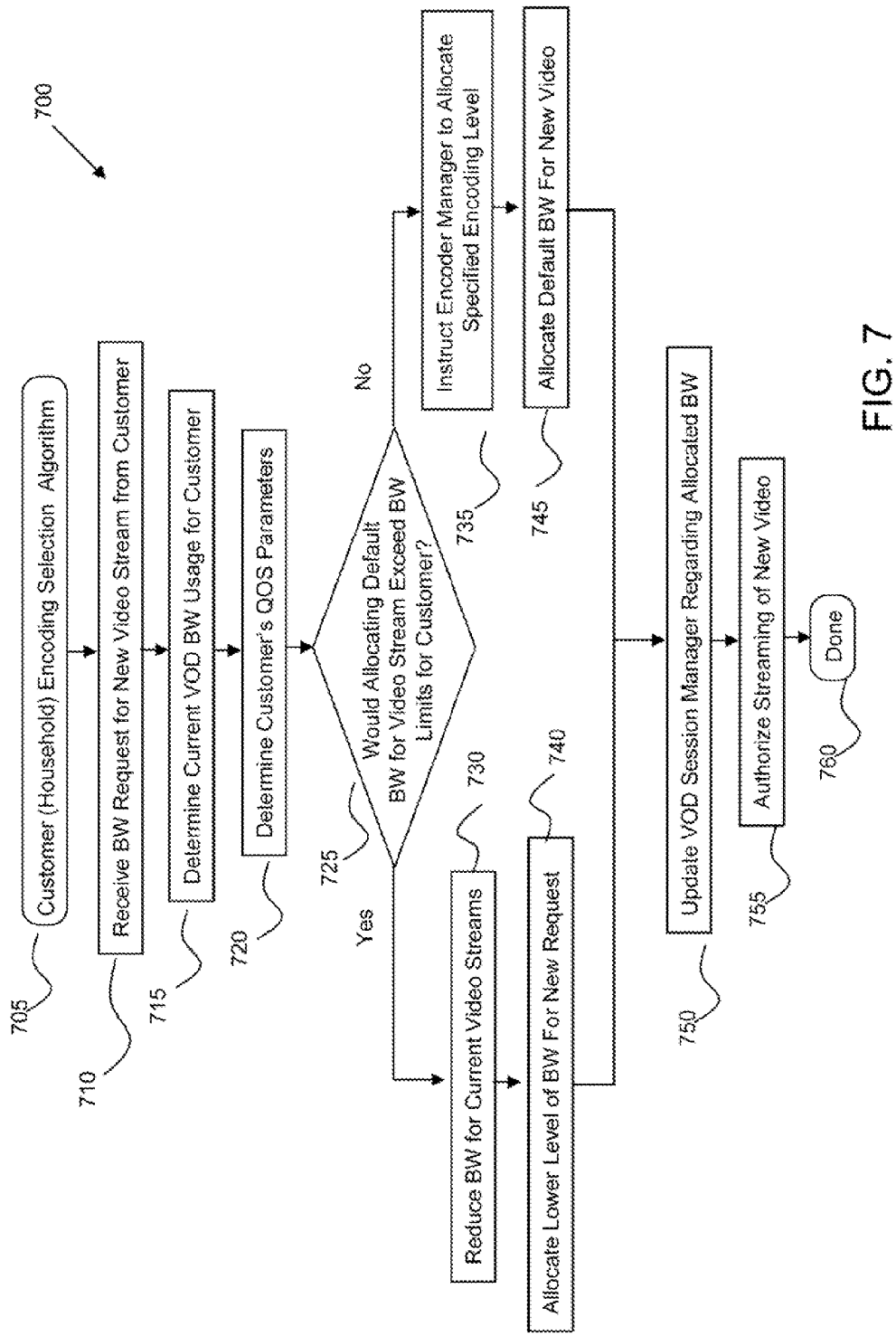
FIG. 7 illustrates one embodiment of the processing in the SQM for selection of an encoding scheme on the basis of a customer.
Figure 8:
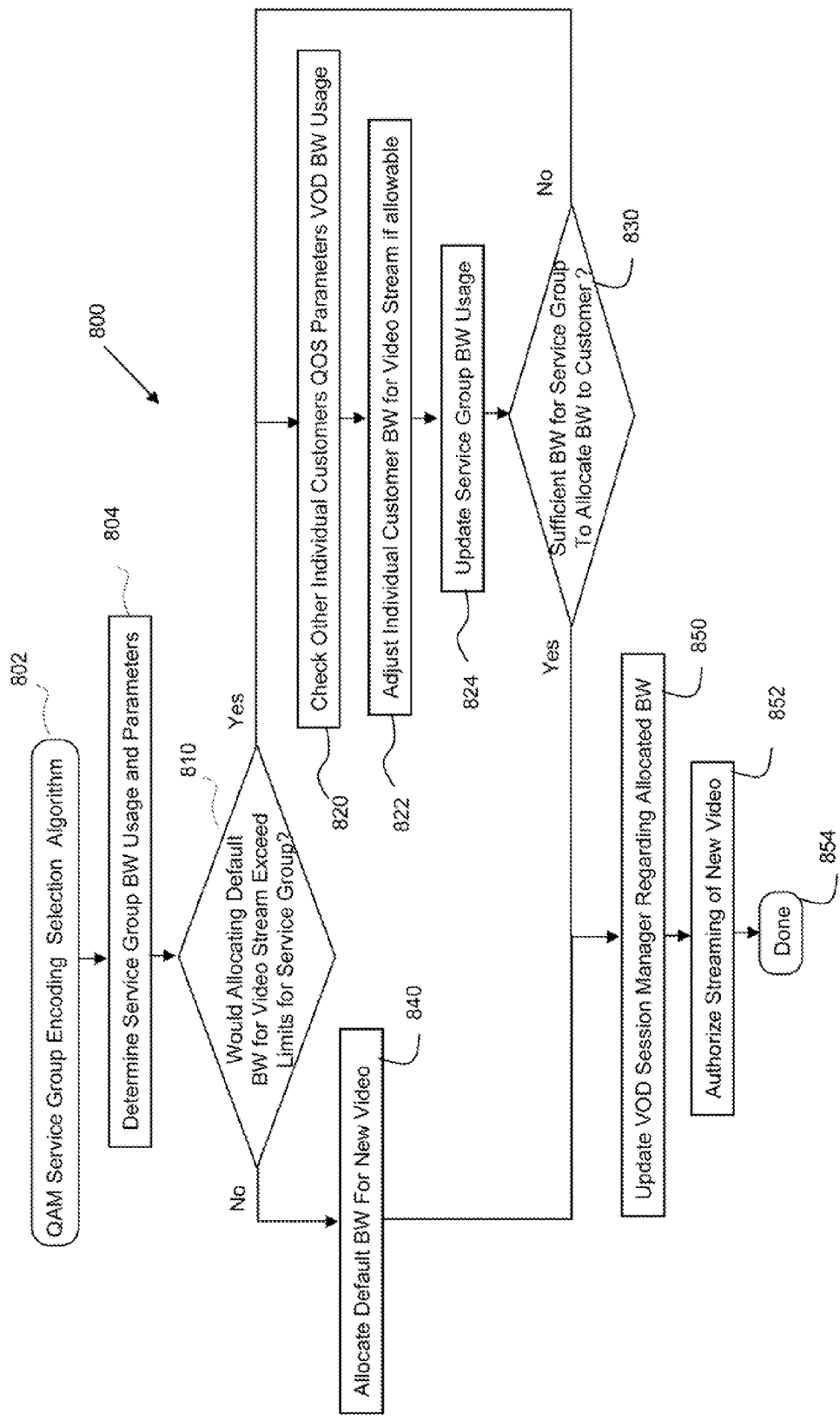
FIG. 8 illustrates one embodiment of the processing in the SQM for selection of an encoding scheme on the basis of a QAM Service Group.
Figure 9:
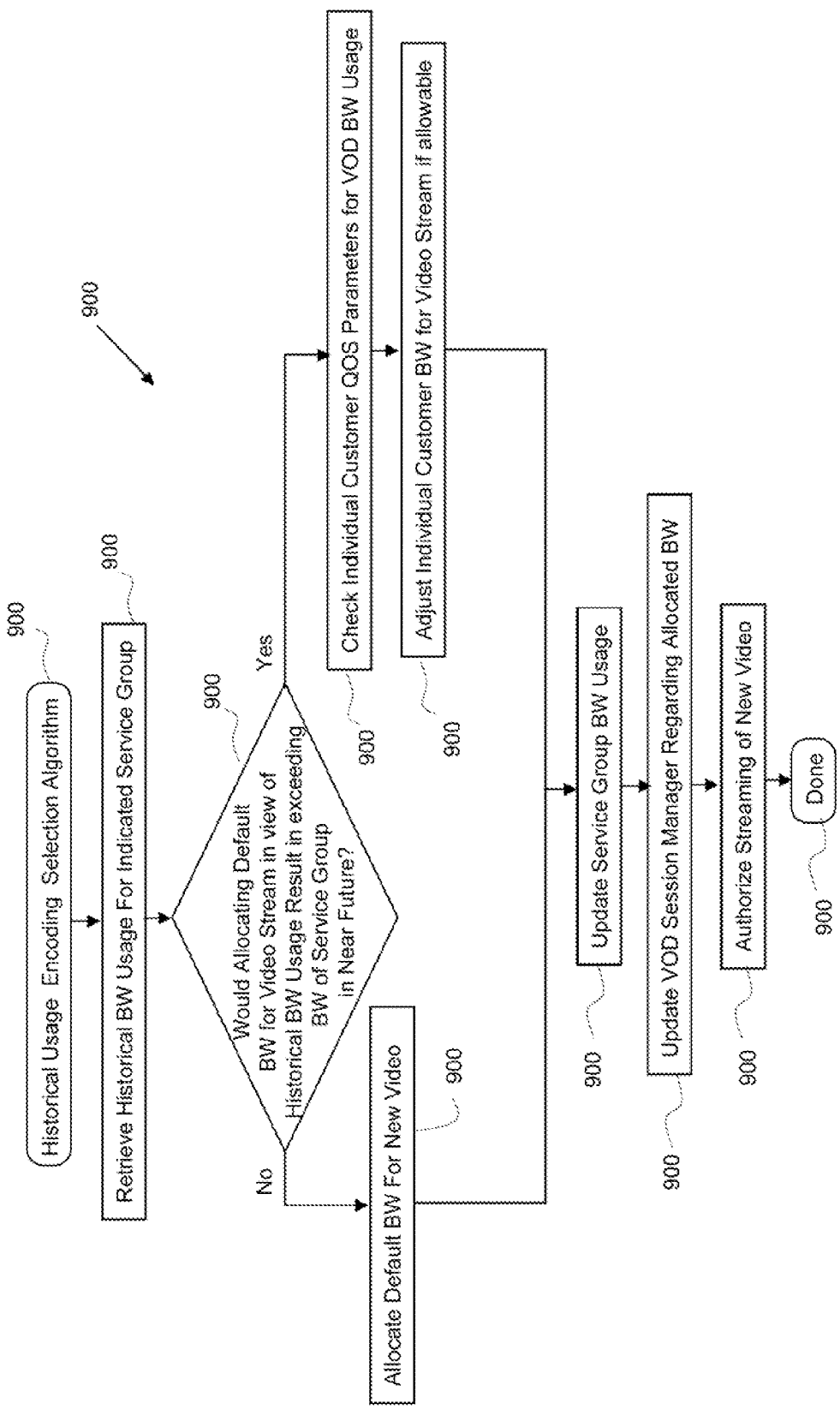
FIG. 9 illustrates one embodiment of the processing in the SQM for selection of an encoding scheme on the basis of using historical data.

FIG. 7 illustrates the processing in the SQM to determine how to accommodate a particular customer's request in context of video streams presently provided to that customer, and in context of that customer's QOS parameters. This requires the network to maintain information about the resources allocated to a customer. FIG. 8 illustrates processing in the SQM to accommodate a particular customer's request in context of a QAM Service Group. In this case, the context involves determining a BW threshold or set of encoding rates that can be allocated to the QAM Service Group, and whether accommodating the customer's request will be exceed this value. If so, then modification of the presently provided video streams to the Service Group, or modification to the encoding level associated with the current video is request. The service group bandwidth allocation algorithm 802 presumes that the step of receiving a VOD request from a member of the Service Group has already occurred. The next step 804 determines the allocated BW for the Service Group and what limits have been established for the Service Group. Next, in step 810, the SQM determines if allocating the default rate encoding for the requested video stream would exceed a threshold for the Service Group. If the determination is "no," then step 840 is performed which sets the appropriate encoding level for the video stream.

If the determination is step 810 that the encoding level would exceed a Service Group threshold, then the SQM determines which of the customers in the Service Group are receiving video streams, and compares the present encoding level for each stream with each customer's individual usage in step 820. The SQM in step 822 modifies the encoding level, and thus the BW consumed for a given customer, and updates the Service Group's BW usage in step 824. The SQM then tests whether modifying the encoding level has sufficiently made BW available for the Service Group such that the SQM can allocate BW for the present customer making the request. If the determination is "no," then the process returns to step 820 and checks other customers. In this embodiment, it is presumed that there are sufficient number of customers in the Service Group whose encoding can be reduced to provide sufficient BW to accommodate the present request. Whether this is possible depends on how the service levels were engineered for the members of the Service Group.

Thus, at some point at step 830, the SQM will typically determine that sufficient BW has been made available to accommodate the viewer's request. At this point, the VOD Session Manage can provide the stream, and can updated the allocated encoding (and associated BW used) for that stream in step 850. In other embodiments, the SQM can maintain data regarding the allocated BW for the video stream. In step 852, the SQM authorizes the VOD server to then stream the video and the process completes in step 854.

FIG. 8 illustrates in part how the SQM can manage the encoding levels of different customers in a Service Group in response to one of the customers adding a new VOD session. In some embodiments, there may not be sufficient ability to reduce other customers' encoding levels to provide sufficient BW for the presently requested VOD Session. In such cases, the SQM may have to deny the request for the new VOD Session. In various embodiments, some customers may have QOS parameters which guarantee a certain level, so that it may not be possible to modify their encoding rate. Various embodiments can create different rules for doing so. For example, a customer #1 may be entitled to one high encoding level stream, or three low encoding streams. The rule can be defined so that if customer #1 has only one stream, it will always be a high level encoding scheme. In the context of processing a new VOD Session request in a Service Group involving another customer (customer #2), the SQM may review the encoding level assigned to customer #1. If there is only one VOD session for customer #1, the SQM may leave it as allocated, and determine if there is another customer whose VOD stream encoding level can be modified. If, however, customer #1 has two VOD streams, both of which are at a high encoding level, then the SQM may reduce both to a low encoding level. Thus, whether the SQM modifies customer #1's encoding level depends on how many streams exist for that customer and what limitations are defined in that customer's QOS parameters, and how the SQM defines its rules. For example, in one embodiment the SQM could first reduce customer #1's two VOD streams to two medium encoded video streams, and determine whether that provides adequate BW for the Service Group to accommodate customer #2's request.

How the SQM determines to adjust a customer's encoding levels can be impacted not only by QOS parameters for that customer, or threshold levels defined for a QAM Service Group, but also by historical BW or rate level usage data maintained for the customer or the QAM Service Group. The SQM can apply various rules to determine priority for modifying existing rate encodings so as to accommodate a request. As discussed in FIG. 5, the SQM 130 may access historical usage data maintained by a database 504. The use of historical usage data can be used to determine how adjustments to encoding levels occur for existing VOD streams as well as how to allocate an encoding level for a pending request.

Figure 11:
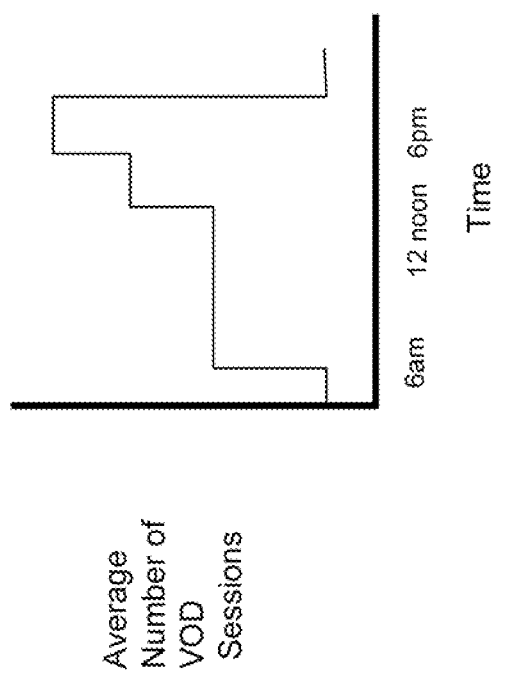
FIG. 11 illustrates one embodiment of historical data used in selection of an encoding scheme.

The historical data indicates when peaks of VOD sessions are likely to be expected, and can suggest a likely number of maximum VOD session that will be encountered during a time period. Thus, when the SQM is informed of a request for a VOD session, the SQM can determine a pertinent time window for reviewing the historical data. This can be determined in one embodiment from the program being requested (e.g., meta-data about the movie will indicate its duration) or the SQM can simply use a default value (e.g., presuming that most VOD movies have an approximate 2 hour duration). For example, FIG. 11 illustrates a hypothetical record of the number of VOD sessions that are active on a particular day of the week relative to time during the day. Each day of the week may have different characteristics (e.g., more VOD requests may occur on a weekend evening than during the week). As may be expected, the number of VOD requests may increase in the evening, and drop off in the early morning. Thus, a VOD request for an additional video stream received when the average number of sessions is relatively low (e.g., 6 a.m.) is not likely to create an allocation issue for the next two hours (the duration of the VOD program). However, based on the historical data, selection of a movie at 6:00 p.m. may create an allocation issue in the coming two hour window, as the average number of VOD sessions increases during a peak time, which could occur around 8:00 p.m.

Figure 10:
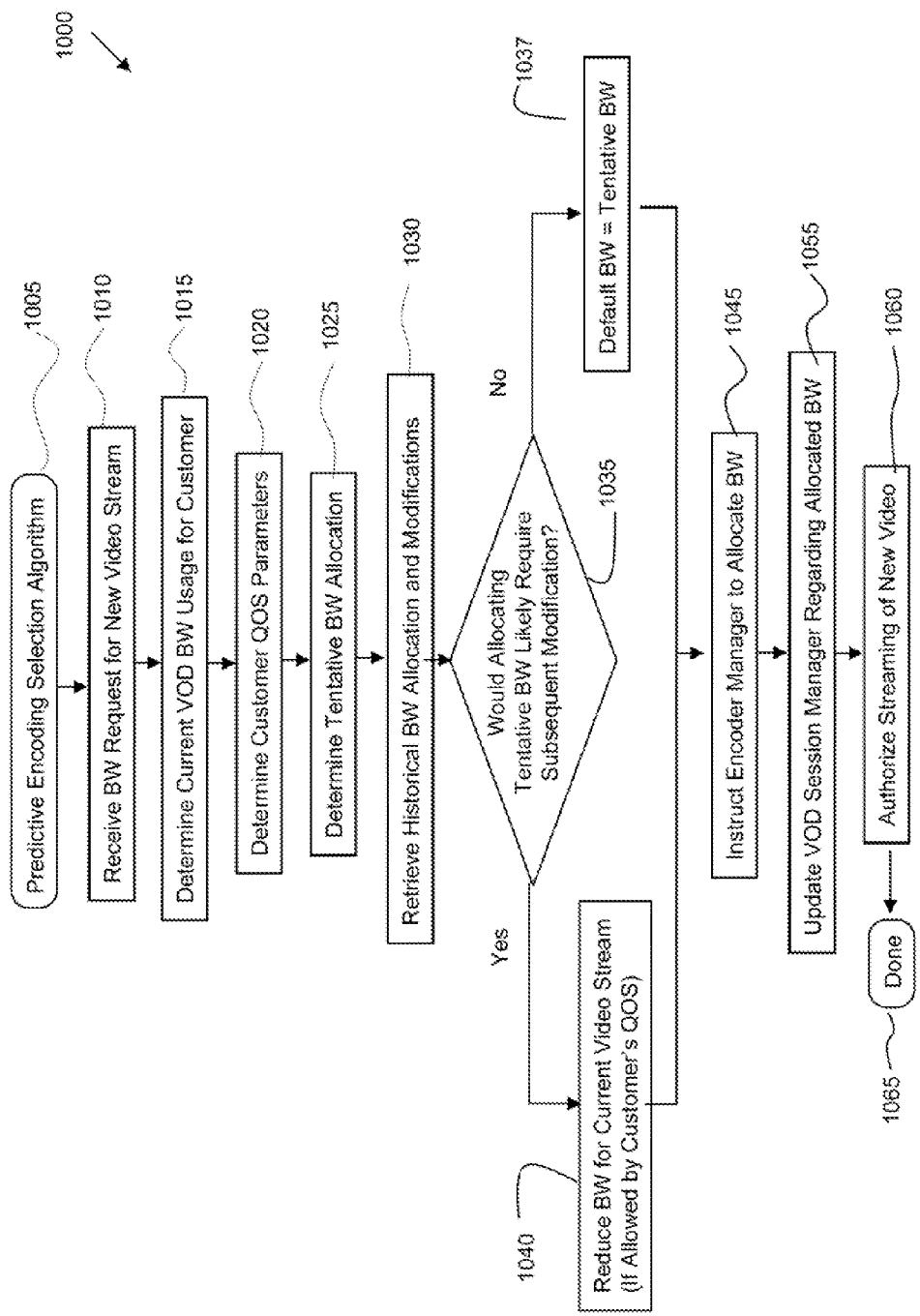
FIG. 10 illustrates another embodiment of processing in the SQM for selection of an encoding scheme on the basis of using historical data.

One embodiment for the SQM processing that takes into account the historical data is shown in FIG. 10. The process 1000 begins with receiving a request for an encoding rate for a new video stream in step 1010. The SQM determines in step 1015 the current BW usage for that customer, which involves determining whether the customer presently has any VOD active sessions. The SQM also retrieves the customer's QOS parameters in step 1020, and in step 1025 determines a tentative rate encoding to use for the session. In step 1030, the SQM obtains historical BW allocation, which can be defined for the particular customer, for a QAM Service Group, and/or for some other size group.

In step 1035 the SQM ascertains whether allocation of the tentative encoding rate for the requested video stream would result in subsequent modification of either: 1) that video stream, or 2) some other video stream during the time window of the requested video stream. If the answer is "no," then the default bandwidth can be defined as the tentative bandwidth. If however, allocating the tentative bandwidth is likely to create an issue in the upcoming time window, then the SQM checks whether the customer's QOS parameters allow a lower quality encoding rate. Presuming the QOS parameters allows a lower encoding rate, then the lower encoding rate is allocated to the video stream. The SQM in step 1045 then instructs the Encoder Manager to allocate the appropriate encoders to encode the video stream at a lower rate. In step 1055, the updated allocated BW or encoding rate is stored in the VOD Session Manager (or other component). Finally, the SQM authorizes the VOD Server to stream the new Video in step 1060, and the process is completed in step 1065.

The above algorithm is but one way in which historical usage data can be used by the SQM to determine which encoding rate should be allocated for a requested VOD stream. The historical data can be used in other ways. For example, if expectation of a future BW allocation issue exists, the SQM may address that issue when the subsequent request is made. The above embodiment presumes an approach where BW allocated is minimized in order to avoid altering encoding rate for a stream while the session is in progress. Certain networks/equipment may be able to select a particular encoding rate at the beginning of a VOD session, but may not be able to alter the encoding level after streaming has begun. Thus, in such an arrangement, it may be more desirable to allocate a lower encoding rate initially, if the customer's QOS parameters allow it.

The historical data can also be used in other ways as well. For example, a review of assigned encoding rates over time may inform network personnel that certain encoding levels are never used. For example, it may be determined sufficient capacity exists so that a low encoding level is never used, and hence it should never be assigned. The historical data may define certain encoding levels as "excluded" and never used. The SQM can then be overridden, in effect, by defining certain encoding levels as prohibited in the historical rate or BW allocation data (or by defining the allocation rules in the SQM).

Typical Application

A typical application of the system will be explained with regard to a viewer (i.e., customer). In this embodiment, the viewer has subscribed to one high quality VOD stream, or alternatively, two medium quality VOD streams. The viewer is part of a QAM Service Group, comprising other nearby situated households, but the viewer is likely not aware of this aspect.

Using FIG. 5 to illustrate the process, the viewer (not shown) requests a VOD service, which results in a request being sent to a VOD Session Manager 132. The VOD Session Manager determines the viewer can request a VOD session, and makes available the VOD stream. The VOD Session Manager then requests the SQM 130 to determine what quality encoding should be used. The SQM is aware that this is the only active VOD session for the viewer (this may be indicated by the VOD Session Manager). The SQM then consults the Customer's QOS parameters in database 134 and determines that the viewer is to be provided with one high quality encoded VOD stream, or two medium quality VOD streams. The SQM also knows from the historical usage data stored in database 504 that the request is being made near a peak request time. For purposes of illustration, it is assumed the VOD request is made at 7:30 p.m. on a Saturday night when many households, including the viewer, request VOD streams. The SQM also knows from the Service Group Parameters the amount of bandwidth available for allocation in the QAM Service Group. The SQM then determines the appropriate encoding level and informs the Encoding Rate Manager 502 which switches and encoders to enable the desired encoding rate (recall that a number of embodiments are possible as to how the encoded video stream can be obtained). Other processing to complete the provision of the VOD stream to the user occurs as necessary. In this example, it is assumed that sufficient bandwidth is available for allocating a single high-quality encoding stream to fulfill the viewer's request. The Encoding Rate Manager then informs the SQM that the encoding level can be provided. The SQM updates the historical data usage as appropriate. The exact sequence of how the VOD Session Manager interact to control the provision of the stream in conjunction with the SQM can vary.

Further aspects of the invention are now illustrated when the same viewer now makes a second request for a VOD stream that occurs simultaneous with the first VOD stream. Again, the user initiates a VOD request, and the VOD Session Manager in the VOD Server checks if the request can be fulfilled. As part of the processing, the VOD server requests the SQM 130 to determine and provide the appropriate encoding level.

The SQM knows that the viewer has an active VOD stream of high quality, and that a second request is made. The SQM can query the VOD Session Manager, or the latter can inform the former. The SQM knows from the customer's QOS parameters that a second stream is allowed, but that if there is a second stream, SQM knows that both streams may be reduced to a medium encoding level. The service provider may have a rule defined in the SQM that the second stream must be of medium quality encoding, but the first stream may be either high or medium quality, depending on conditions. The SQM further knows that given the Service Group Parameters and the Historical Usage Data that it will likely be necessary to reduce the quality of the first stream due to frequent requests from other customers in the QAM Service Group at this same time.

Thus, the SQM implements the algorithms to determine the encoding level and allocate a medium quality encoding for the second VOD stream. The SQM also instructs the Encoding Rate Manager to generate the appropriate signals among the encoders, switches, etc. to provide the second VOD stream at a medium encoding rate. The SQM informs the VOD server of this information, and updates the historical usage information data. The SQM also informs the Encoding Rate Manager to reduce the encoding rate of the first stream. Thus, the viewer is now presented with two simultaneous streams with a medium level of encoding.

The SQM can be programmed with various rules to modify or impact the selection of the encoding level. For example, the SQM could allow the first VOD stream to continue at a high encoding rate if the movie was sufficiently near completion. Thus, the SQM may allow the first movie to remain unchanged, with the likelihood that additional requests from other viewers are not expected until after the first stream has finished.

The principles of the present invention can also be extended to video streams provided by the cable headend using an IP connection. Thus, returning to FIG. 1, the viewer may receive a video stream from a VOD server over an Internet connection using a cable modem 107. The VOD Servers may be configured to generate an IP compatible stream, or can direct the stream to an IP encoder. The source of the VOD Stream may be from a VOD Server in the cable provider, so that the provision of VOD Stream may be provided as previously indicated. In other embodiments, the source of the video traffic may originate from an server directly handling Internet traffic, and capable of streaming IP based videos. In this embodiment, a transcoder to convert protocols from one format to another may not be required. The main distinction is that the delivery mechanism is via an IP connection over the cable distribution network. Thus, the cable service provider can also manage the provision of VOD programming to the viewer's computer.

Those skilled in the art will recognize that many variations of the present invention are possible, than what is disclosed herein. For example, determination of the levels of resources can be tracked via BW, or by tracking the number of encoding session. Or, the domain of the Service Group can include other sizes and metrics than what is disclosed. The exact network configuration can vary, and can be embodied in various combinations of equipment.

That which is claimed:

1. A system for determining an encoding rate for an MPEG based digital video information stream comprising:
    a service quality manager server comprising a processor configured to determine an encoding rate of a digital video information stream for a customer comprising a viewer of a cable system, said processor configured to:
    receive a video quality service parameter from a service profile of said customer wherein said video quality service parameter indicates a level of video quality to be streamed to said customer,
    determine whether said customer is presently being provided with another digital video information stream in response to a previous video on-demand request, and if so, determining an associated encoding level of said another digital video information stream,
    determining a level of resource allocation related to bandwidth on a shared transmission medium serving said customer,
    determining one from a plurality of encoding rates for said viewer in response to a present request for video on-demand service,
    reducing the quality of video encoding presently used for said another digital video information stream being provided to said customer in response to the present request for a video on-demand service when it is determined that said customer is presently being provided with said another digital video information stream;
    providing authorization for a VOD Server comprising a VOD Session manager to provide said digital video information stream, wherein said digital video information stream is encoded at said encoding rate, and
    updating said level of resource allocation commensurate with said encoding rate used to encode said MPEG based digital video information stream and by taking into account the reduction of quality of said another digital video information stream.

2. The system of claim 1 further comprising an encoding rate manager, comprising a second processor configured to communicate with an encoder, wherein said encoder encodes said MPEG based digital video information stream from a first encoding rate to a second encoding rate.

3. The system of claim 1 further comprising a VOD Session manager comprising a second processor configured to inform said service quality manager whether said customer is presently being provided with another digital video information stream in response to said previous video on-demand request.

4. The system of claim 1 further comprising a historical usage database comprising data pertaining to prior encoding rates used to encode digital video information streams for said viewer, wherein said service quality manager server processor is configured to query said historical usage database.

5. The system of claim 1 comprising a resource allocation database, storing information of encoding rates presently allocated to a plurality of viewers.

6. The system of claim 1 wherein said one from a plurality of encoding rates is above a minimum encode rate indicated in a customer service profile of said viewer.

7. The system of claim 6 wherein updating said level of resource allocation commensurate with said encoding rate used to encode said MPEG based digital video information stream does not exceed a threshold level associated with said customer service profile.

8. A method for selecting an encoding rate comprising the steps of:
receiving a request for determining an encoding rate for an MPEG based digital video information stream associated with a video on-demand request from a viewer, said request originating in response to said viewer requesting a video on-demand service;
determining a video quality encoding level associated with a customer service profile associated with said viewer;
determining whether said customer is presently being provided with another digital video information stream in response to a previous video on-demand request from said customer;
determining a level of resource allocation related to bandwidth on a shared transmission medium serving said customer;
selecting said encoding rate from a plurality of encoding rates for said MPEG based digital video information stream for said viewer in response to a present request from said viewer for said video on-demand service;
reducing the quality of video encoding presently used for another digital video information stream being provided to said customer in response to a present request for a video on-demand service when it is determined that said customer is presently being provided with said another digital video information stream;
providing authorization for a minimum encoding rate for said customer is defined in a customer service profile, and comprising a VOD Session manager to provide said digital video information stream, wherein said digital video information stream is encoded at said encoding rate, and
updating said level of resource allocation commensurate based on said encoding rate used to encode said MPEG based digital video information stream and by taking into account the reduction of the quality of said another digital video information stream.

9. The method of claim 8 further comprising the step of:
selecting one of a plurality of MPEG based digital video files stored in a VOD server, wherein each of the plurality of MPEG based digital video files are of a common video program encoded at different encoding rates; and
streaming said one of a plurality of MPEG based digital video files to said viewer.

10. The method of claim 8 further comprising the steps of:
querying a historical usage database comprising historical encoding rate usage data pertaining to previously used encoding rates used to encode digital video information for said viewer;
determining said selected encoding rate using said historical encoding rate usage data.

11. The method of claim 8 wherein the updating of said level of resource allocation records an encoding rate used for encoding said digital video information.

12. The method of claim 11 wherein said selecting encoding rate is above a minimum encoding rate defined for said customer in a customer service profile.

13. The method of claim 8 wherein said VOD server stores a plurality MPEG based digital video information stream at different encoding rates associated with a common movie program.

14. The method of claim 8 wherein determining a level of resource allocation related to bandwidth on a shared transmission medium serving said customer further comprises determining a level of resource allocation to a Service Group comprising a plurality of customers.

15. The method of claim 14 wherein the Service Group comprising a plurality of customers comprises a set of customers sharing a common QAM modulator.

16. The method of claim 15 wherein updating said level of resource allocation commensurate based on said encoding rate used to encode said MPEG based digital video information stream comprises updating usage of said Service Group.

* * * * *